United States Patent
Gaillard et al.

(10) Patent No.: US 8,545,932 B2
(45) Date of Patent: Oct. 1, 2013

(54) METALLIZATION OF A POROUS SILICON ZONE BY IN SITU REDUCTION AND APPLICATION TO A FUEL CELL

(75) Inventors: Frederic-Xavier Gaillard, Voiron (FR); Olivier Raccurt, Chelieu (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 549 days.

(21) Appl. No.: 12/893,613

(22) Filed: Sep. 29, 2010

(65) Prior Publication Data

US 2011/0086165 A1     Apr. 14, 2011

(30) Foreign Application Priority Data

Oct. 8, 2009  (FR) .................................. 09 04814

(51) Int. Cl.
*B05D 5/12*        (2006.01)
(52) U.S. Cl.
USPC ........................................................ 427/115
(58) Field of Classification Search
USPC ............... 427/115, 256, 261, 265; 429/535
See application file for complete search history.

(56) References Cited

U.S. PATENT DOCUMENTS 5,389,496 A * 2/1995 Calvert et al. ................. 430/315

FOREIGN PATENT DOCUMENTS

| CN | I966765 A | 5/2007 |
|---|---|---|
| WO | WO 2004/061991 A1 | 7/2004 |
| WO | WO 2009/150311 A1 | 12/2009 |

OTHER PUBLICATIONS

S. P. Zimin, "Classification of Electrical Properties of Porous Silicon," *Semiconductors*, 2000, vol. 34, No. 3, pp. 353-357.

* cited by examiner

*Primary Examiner* — Michael Cleveland
*Assistant Examiner* — Tabassom Tadayyon Eslami
(74) *Attorney, Agent, or Firm* — Oliff & Berridge, PLC

(57) ABSTRACT

A porous silicon zone is metallized by performing in situ reduction of metallic ions dissolved in an aqueous solution and fixing of the metallic particles obtained on said zone in a single step. This step consists in particular in bringing the solution containing the metallic ions into contact with the zone to be metallized, the surface whereof has previously been functionalized to enable in situ reduction of the metallic ions and fixing of the metallic particles. Functionalization of the porous silicon zone is achieved by grafting two particular and distinct types of chemical functions. The first function used is a chelating chemical function for the metallic ions and/or for the metal corresponding to the metallic ions, whereas the second function is a reducing chemical function for the metallic ions. Such a metallization can be used for producing an electrically conducting porous diffusion layer of a fuel cell.

14 Claims, 4 Drawing Sheets

METALLIZATION OF A POROUS SILICON ZONE BY IN SITU REDUCTION AND APPLICATION TO A FUEL CELL

BACKGROUND OF THE INVENTION

The invention relates to a method for metallization of at least a porous silicon zone comprising terminal hydroxide groups.

The invention also relates to the use of a metallized zone obtained by such a method as current collector of a fuel cell.

STATE OF THE ART

Porous silicon is in general obtained by electrochemical methods which may or may not be accompanied by illumination (method called photoelectrochemical), and more precisely by anodic dissolution in the presence of hydrofluoric acid, from a single-crystal silicon layer.

According to the parameters used (electrolytic solution, current, voltage, illumination, and so on) and to the nature of the silicon itself (doping, doping conditions, resistivity of the substrate, and so on), such a method enables a predefined porosity to be obtained. The silicon can thus be microporous with a mean pore diameter of less than 2 nm, mesoporous with a mean pore diameter between 2 nm and 50 nm, or macroporous with a mean pore diameter of more than 50 nm.

In general manner, p+ type substrates present a high charge carrier density (of about $10^{19}$ atoms/cm$^3$) with a resistivity of about a few milliOhms·cm. They are therefore easily made porous in a hydrofluoric acid solution, without illumination, and advantageously present pores of mesoporous type. Silicon substrates of n or n+ type on the other hand require illumination. Finally, p-doped silicon substrates can be made porous without illumination. However, as they present a higher resistivity (of about a few Ohms·cm and more, which is equivalent to boron doping of about $10^{15}$ atoms/cm), these p-doped substrates are in general subjected to backside implantation to enhance the appearance of pores.

Thus, according to these parameters (backside doping, substrate resistivity), porous silicon of microporous, mesoporous and macroporous type can be obtained over a thickness of several micrometers. For example, a p+ silicon substrate was made mesoporous in a 15% hydrofluoric acid medium by applying a current density of about 5 mA/cm$^2$. Furthermore, control of these parameters enables the porosity ratio to be made to vary from 10% to 90%.

Furthermore, making the silicon porous by anodic dissolution in hydrofluoric acid increases the electrical resistivity of the substrate by several orders of magnitude. The electrical resistivity of the substrate then increases from a few milliOhms·centimeter (mΩ·cm) to a few Ohms·centimeter (Ω·cm). Values of about $10^5$ Ω·cm and more have for example been measured for silicon layers presenting a high porosity, as related in the article "Classification of Electrical Properties of Porous Silicon" by S. P. Zimin et al. (Semiconductors, Vol. 34, N°3, 2000, pp 353-357). In this article, S. P Zimin et al. more particularly established a classification of the electrical properties of porous silicon in four groups, according to the distribution of the depleted regions in porous silicons presenting different morphologies (pore size, porosity ratio, dispersion of pores within the substrate, etc).

The resistivity of a porous silicon substrate therefore has to be lowered before the latter is used in a large number of applications.

But even though a large number of scientific works have dealt with the electrical conduction mechanisms of porous silicon, and more particularly with the resistivity changes observed once the bulk silicon has been made porous, there have not been very many developments devoted to improving this parameter.

One of the approaches enabling a lower resistivity to be obtained for porous silicon consists in metallizing the latter, i.e. in adding a metallic deposition in order to increase the electrical conductivity of the substrate.

The following can be cited among the available metallization methods—ion implantation, chemical vapor deposition (CVD), physical vapor deposition (PVD), deposition by sputtering, electrochemical deposition or electrolysis-free deposition.

These methods are not however always suited to the type of material obtained or to the architecture of the substrate concerned. They are moreover complex to implement.

Thus, in the case of ion or plasma implantation, doping of Boron, Arsenic, etc. type only takes place at the surface of the layer involved, over a thickness of a few nanometers. Such a technique therefore does not enable a silicon substrate to be metallized over its whole thickness (for example about a few micrometers). Furthermore, the electrical resistivity obtained superficially can vary in time with such a method.

Metallization by deposition for example of CVD, PVD or sputtering type enables a metallic layer to be formed at the surface of the substrate. However, the metal may have difficulties in diffusing into the depth of the porous substrate. The same diffusion problem may also arise with metallization by electrochemical means. The pores can in fact be obstructed at the surface of the porous silicon substrate, which prevents homogeneous diffusion of the chemical solution through the silicon pores into the thickness of the substrate.

The conditions for good metallization are in fact all the more delicate the smaller the dimensions of the pores. The problem of obtaining a good metallization therefore arises more particularly in the case of mesoporous silicon and of microporous silicon.

OBJECT OF THE INVENTION

The object of the invention is to propose a new method for metallization of at least a porous silicon zone comprising terminal hydroxide groups that is improved and made easier compared with the techniques according to the prior art, and more particularly enabling homogeneous metallization to be achieved throughout the thickness of the zone to be metallized and in pores that are difficult to access, According to the invention, this object is achieved by the fact that metallization is performed in a step of bringing said zone into contact with metallic ions dissolved in an aqueous solution containing at least one organic solvent promoting said bringing into contact, said zone, prior to the step of bringing into to contact, having been grafted by two distinct types of chemical functions, respectively reducing for the metallic ions and chelating for the metallic ions and/or for the metal corresponding to said metallic ions.

According to a preferred embodiment, the zone is grafted by the thiol chemical function and by the ethylene diamine chemical function.

The porous silicon zone is moreover advantageously mesoporous.

A further object of the invention is the use of a metallized zone obtained by such a method as an electrically conducting diffusion layer of a fuel cell.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 1:
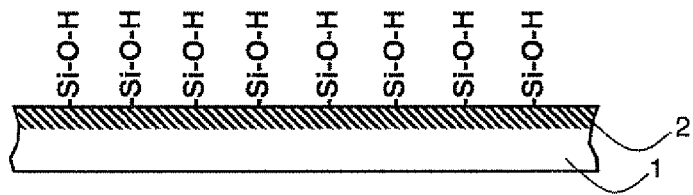
FIGS. 1 to 4 represent, for illustration purposes, the formation mechanism of silver particles at the surface of a porous silicon substrate grafted with by the thiol and ethylene diamine chemical functions.

It is proposed to metallize at least a porous silicon zone by performing in situ reduction of metallic ions dissolved in an aqueous solution and fixing of the metallic particles obtained on said zone, in a single step. The porous silicon zone is advantageously mesoporous. The mean diameter of the pores of said zone is, in this case, more particularly comprised between 2 nm and 50 nm.

This step consists in particular in bringing the solution containing the metallic ions into contact with the zone to be metallized, the surface of which zone has been previously functionalized to enable in situ reduction of the metallic ions and fixing of the metallic particles.

To do this, the surface of the zone to be metallized, i.e. the whole of the surface of the pores of the zone to be metallized, comprises terminal hydroxide groups enabling a particular functionalization to be achieved, and more particularly enabling a particular grafting to be performed. In particular, the surface of the zone to be metallized can be provided with a thin film of silicon oxide comprising the terminal hydroxide groups (Si—O—H). The silicon oxide thin film can for example be native silicon oxide present at the surface of any silicon material, either porous or not. It can also be a silicon oxide obtained intentionally by a thermal method. According to an alternative, the surface of the zone to be metallized can be initially non-oxidized at the surface. In this case, the surface of the zone to be metallized can undergo treatment designed to enable creation of terminal hydroxide groups, before or during the grafting operation.

Furthermore, the surface of all the pores of the zone to be metallized is functionalized by covalent bonds, i.e. by grafting, by two particular and distinct types of chemical functions. Grafting is made possible by the presence of the terminal hydroxide groups at the surface of the pores, advantageously provided with a silicon oxide thin film. The first function used is a chelating chemical function for the metallic ions and/or for the metal corresponding to the metallic ions, whereas the second function is a reducing chemical function for the metallic ions.

The chemical functions of chelating type can for example be a thiol, a dithiane, EDTA, a thioglycolic acid, a carboxylic acid, a phosphonic acid, a sulfonic acid and derivatives thereof. What is meant by derivatives are compounds that are able to form said chemical functions of chelating type by hydrolysis.

The chemical functions of reducing type can for example be chosen from an amine, ethylene diamine, a sugar, an ascorbic acid, an ascorbate, hydroquinone and derivatives thereof. What is meant by derivatives are compounds that are able to form said chemical functions by hydrolysis. Such chemical functions of reducing type advantageously enable ions of the following metals to be reduced at ambient temperature: silver, gold, copper, platinum, ruthenium, nickel, lead and cadmium.

The aqueous solution designed to be brought into contact with the zone to be metallized, once the latter has been functionalized by the two types of chemical functions, further contains at least one organic solvent enhancing said coming into contact between the metallic ions and the zone to be metallized. It contains in particular one or more solvents designed to enable a good diffusion of the solution within the zone to be metallized in order to reach all the pores, even the most inaccessible.

For example purposes, a porous silicon substrate was metallized with silver particles, using the chelating/reducing pair constituted by a thiol (—SH) and ethylene diamine (—NH—$CH_2$—$CH_2$—$NH_2$) to perform the grafting step prior to the step of bringing the substrate into contact with an aqueous solution containing $Ag^+$ ions.

FIGS. 1 to 4 in particular illustrate the different steps enabling formation of the silver particles for this particular example.

The silicon substrate used in this example is a bulk single-crystal silicon substrate made porous at least superficially by electrical etching treatment in hydrofluoric acid. Electrical etching treatment thereby enables an open porosity with directional pores to be obtained on at least a part of the porous substrate (from the free surface to the inside of the crystal). Advantageously, the silicon substrate is made mesoporous. For example purposes, the silicon substrate is made porous over a depth comprised between a few hundred nanometers and a few micrometers, with a porosity ratio of 50% to 70% and a mean pore size comprised between 20 nm and 30 nm. Furthermore, this porous part of the silicon substrate is advantageously provided with a thin film of native silicon oxide.

FIG. 1 illustrates the part 1 of the silicon substrate that is made porous, provided with a thin film 2 of silicon oxide. For the sake of clarity, thin film 2 is represented in FIG. 1 as a superficial thin film formed at the surface of silicon substrate 1. The silicon oxide thin film naturally covers not only the visible part of the silicon substrate but also the whole of the surface of the pores internal to the silicon substrate. Thus, FIG. 1 enables it to be simply illustrated that the silicon substrate comprises terminal groups of Si—O—H type designed to enable grafting of the substrate by thiol and ethylene diamine.

The grafting step is in particular performed by immersing substrate 1 in a solution comprising water, ethanol, a precursor for the reducing function and a precursor for the chelating function. The precursor of the thiol function is advantageously 3-mercaptopropyltriethoxysilane (HS—$(CH_2)_3$—Si—$(OCH_2CH_3)_3$) whereas the precursor used for the ethylene diamine function is 2-(aminoethyl) aminopropyltrimethoxysilane ($NH_2CH_2CH_2NH$—$(CH_2)_3$—Si—$(OCH_3)_3$ or one of its oligomers. The two precursors are furthermore advantageously present in equal quantities in the mixture.

For example purposes, the solution used for performing grafting of substrate 1 is formed by mixing 9 mL of ultrapure water, 1 mL of ethanol, 150 µL of Bis(3 trimethoxysilyl) propylethylenediamine and 150 µL of 3-mercaptopropyltriethoxysilane. The mixture can be made under magnetic stirring for 15 minutes. The alcoxy functions of the (3 trimethoxysilyl)propylethylenediamine hydrolyze in solution to form oligomers of (aminoethyl)aminopropylsiloxanes which react with the surface of substrate 1.

The grafting step is then performed by immersing substrate 1 in the solution containing the precursors for about 3 hours at ambient temperature. Advantageously, the solution can be stirred during immersion to guarantee a homogeneous concentration during the functionalization step.

Then immersion of substrate 1 in the solution containing the precursors can be followed by a step of eliminating the precursors that did not react. This elimination step is for example achieved by rinsing the substrate in successive baths respectively made up of ethanol, hexane, a mixture of ethanol and hexane and finally ethanol.

The use of hexane to rinse substrate 1 is in particular advantageous in the case of a porous silicon substrate, as hexane enables the excess precursors that did not react to be solubilized. Furthermore, the use of a rinsing bath containing ethanol or a mixture of ethanol and hexane makes it possible to penetrate into substrate 1, due to the low surface tension of ethanol, and therefore enables all the pores of substrate 1 to be accessed. This then guarantees complete rinsing. This is also the reason why ethanol is used as organic solvent in the solution containing the thiol and ethylene diamine precursors: it enables the solution containing the thiol and ethylene diamine precursors to wet the porous silicon substrate completely thereby enabling all the internal pores of the substrate to be reached, which guarantees complete grafting of porous silicon substrate 1.

The substrate is then dried, for example by means of a blower, to eliminate most of the liquid phase before being placed in an oven for three hours at 110° C. The substrate functionalized in this way is then stored at ambient temperature until a thermal equilibrium is obtained.

Figure 2:
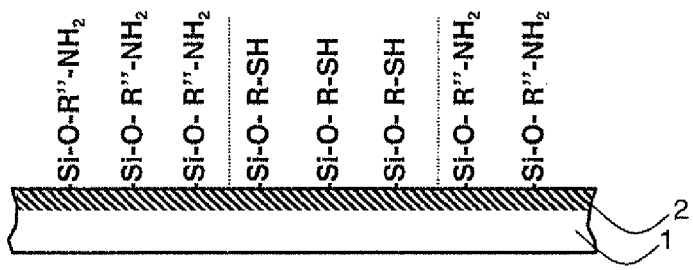

FIG. 2 illustrates functionalization of substrate 1 on completion of these operations. The hydrogen of the Si—O—H terminal group is thus replaced by the —R"—$NH_2$ group linked by covalent bonding to the oxygen of thin film 2 of silicon oxide for ethylene diamine and by —R—SH for thiol. Furthermore, as represented in FIG. 2, grafting is in particular performed by nanodomains. These nanodomains result from a self-organization of the two precursor types, and more particularly of the two silicon alkoxides used as precursors, during their respective reactions with the surface of substrate 1. This self-organization depends in particular on the respective hydrolysis-condensation rates of the two precursors. The surface of the silica nanoparticles thus advantageously comprises adjacent areas of nanometric dimensions each grouping a plurality of chemical functions of the same type.

Figure 3:
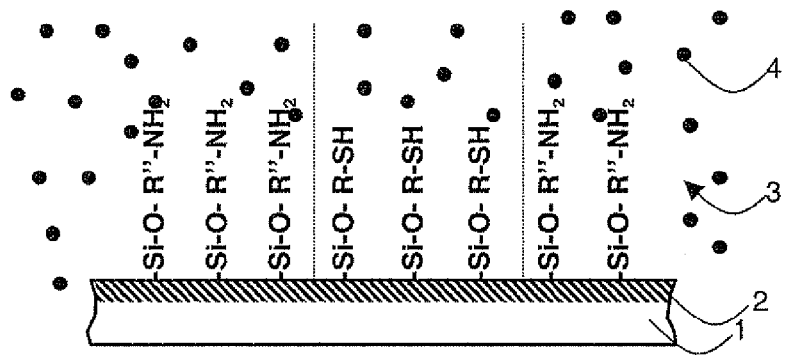
Figure 4:
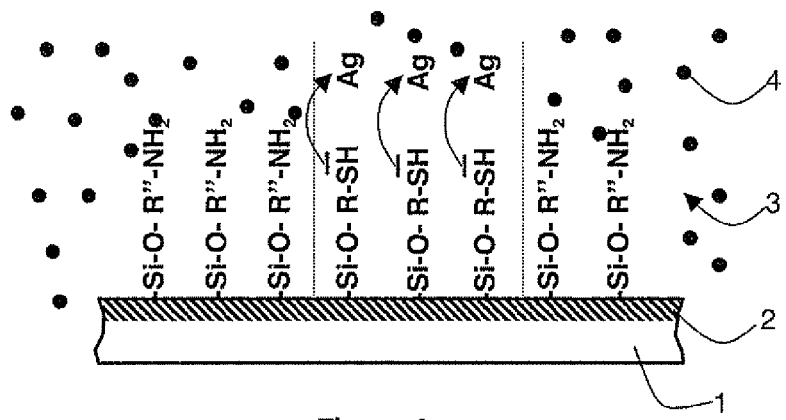

Metallization of the grafted substrate 1 by silver particles is then, as illustrated in FIGS. 3 and 4, achieved by immersing the substrate in an aqueous solution 3 containing $Ag^+$ 4 ions and at least one solvent promoting coming into contact between the ions metallic and the pores of substrate 1. During this operation, the thiol function grafted on support 1 forms complexes with the $Ag^+$ ions of solution 3, whereas the ethylene diamine function enables the $Ag^+$ ions to be reduced. It should however be noted that the ethylene diamine function also forms complexes with the $Ag^+$ ions, these complexes normally being slightly less stable than those formed with thiol. The thiol function further plays a chelating role for the silver once in situ reduction has been performed.

The operation of bringing the $Ag^+$ ions into contact with substrate 1 is for example performed by immersing substrate 1 in an aqueous solution 3 containing silver nitrate, ethanol and hexane for 24 hours. The aqueous solution 3 used for this example more particularly contains 0.45 g of silver nitrate, 10 mL of water, 40 mL of ethanol and 10 mL of hexane. Indeed, as indicated above, due to their low surface tension, ethanol and hexane both enable the aqueous solution containing the $Ag^+$ ions to penetrate into the porous silicon substrate 1 so that each pore of substrate 1 can be metallized.

This immersion step therefore enables silver nanoparticles 2 to be generated by in situ reduction of the $Ag^+$ ions and fixing of the nanoparticles thus formed at the surface of the pores of the silicon. What is meant by silver nanoparticles are silver particles having a mean size of nanometric dimension, i.e. advantageously comprised between 1 and 100 nm.

Rinsing can then be performed by successive immersion in several ethanol baths before drying is performed with a blower. In this case, the use of hexane to perform rinsing is not necessary. The use of ethanol on the other hand remains necessary in order to access all of the pores of substrate 1. It should also be noted that, depending on the porosity of the porous silicon zone to be metallized, the proportion of the organic solvent or solvents used has to be adjusted to guarantee complete wetting of said porous silicon zone, whether it be for the grafting step or for the in situ growth step of the metallic nanoparticles.

Thus, in the example mentioned above, the tests carried out showed, in the case of silver, that starting off from a silver nitrate ($AgNO_3$) as metallic salt, silver nanoparticies can be generated in situ down to the bottom of pores having a width of a few nanometers and a depth of several hundred nanometers.

Figure 5:
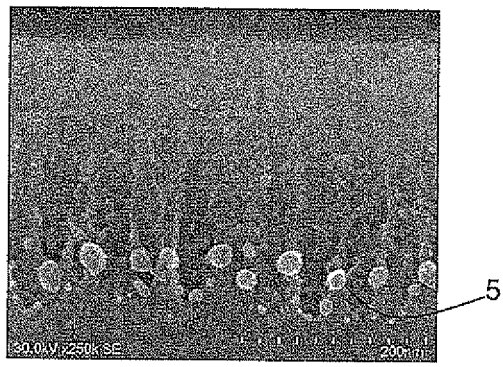
FIG. 5 is a snapshot obtained by electron scanning microscopy of a cross-section of a porous silicon substrate comprising silver particles generated in situ inside the pores.
Figure 6:
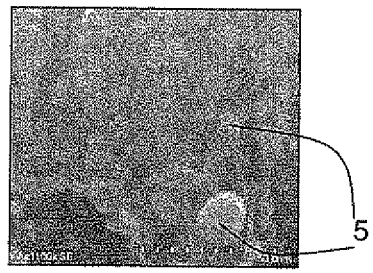
FIGS. 6 and 7 are enlargements of two particular zones of the substrate in cross-section represented in FIG. 5.
Figure 7:
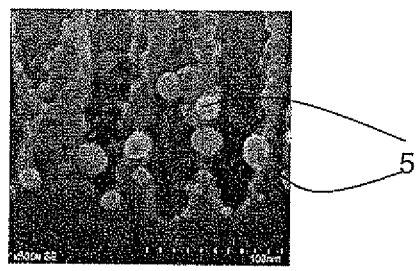

The snapshots represented in FIGS. 5 to 7 obtained by scanning electron microscopy illustrate these tests.

FIG. 5 represents a cross-sectional image of porous silicon substrate 1 with silver particles 5 fixed on the bottom of the pores of said substrate 1.

FIG. 6 is a snapshot corresponding to the centre of the porous silicon substrate. It shows that the walls of the pores are covered by silver particles 5.

FIG. 7 is a snapshot corresponding to the bottom of the pores of the substrate. It illustrates the fact that particles 5 are fixed down to the bottom of the pores and that, for this sample, they are of large size.

For the tests carried out, the silver particles are discrete. It is however also possible to form metallic nanoparticles with a high surface density and even to obtain a continuous metallic thin film by percolation of the nanoparticles formed in this way if the deposit is sufficiently dense. Such a metallization method presents the advantage of being very simple to implement in so far as reduction of the metallic ions is performed in situ and at the same time as fixing of the metallic particles. It further presents the advantage of enabling the size and surface distribution of the metallic particles formed to be controlled by controlling the ratio between the two types of chemical functions present at the surface of the silica support.

Tests were also successfully carried out with other metallic salts: gold chloride, nickel chloride and hydrated copper nitrate.

Furthermore, although the tests set out above were performed with the chelating/reducing pair formed by an ethylene diamine and a thiol, such a method can be generalized to other chelating/reducing pairs suited to the oxidizing-reducing pair formed by the metallic ion and the metal that is desired to be formed at the surface of the substrate. In particular, for the other chelating/reducing chemical functions mentioned above, the precursors able to be used to perform the grafting step are advantageously, as for the thiol/ethylene diamine pair, derivatives of silicon alcoxides respectively comprising the chelating and reducing functions. In general manner, they can be represented by formulas of respective type X—R—$SiZ_1Z_2Z_3$ and X'—R'—$SiZ'_1Z'_2Z'_3$:

where:
R and R' are groups chosen from the $C_1$-$C_5$ alkyl chains, unsaturated or not, and from the phenyl groups,
$Z_3$ and $Z'_3$ are chemical groups chosen from a methoxy-group, an ethoxy-group, a propoxy-group, an acethoxy-group, chlorine and hydrogen,
$Z_1$ and $Z_2$ are identical to one another and are a chemical group chosen from a methyl group, an ethyl group, a propyl group, an isopropyl group, a butyl group, an isobutyl group and the $Z_3$ chemical group,
$Z'_1$ and $Z'_2$ are identical to one another and are a chemical group chosen from a methyl group, an ethyl group, a propyl group, an isopropyl group, a butyl group, an isobutyl group and the $Z'_3$ chemical group,
X is the chemical function of chelating type and X' is the chemical function of reducing type.

Thus, for thiol and ethylene diamine, X=SH and X'=—NH—$CH_2CH_2$—$NH_2$. It should be noted that, for the sake of clarity, in FIGS. 2 and 3, the —R'—NH—$CH_2CH_2NH_2$ group is replaced by —R"—$NH_2$, where R"=—R'—$NHCH_2CH_2$.

The reducing chemical function able to be used in the metallization method can also be the hydrazonium ion ($N_2H_5^+$). The hydrazonium ion, like hydrazine, does in fact present a strong reducing power. The hydrazonium ion can be grafted onto the silica support by means of a coupling agent of silane type presenting an X" function. The X" function is a chemical function able to be replaced by the hydrazonium ion ($N_2H_5^+$) when hydrolysis is performed with addition of hydrazine.

The silane coupling agent can therefore advantageously be chosen from:

Bis(Trichlorosylilethyl)phenyl sulfonyl or $Cl_3SiCH_2CH_2)_2C_6H_4SO_2Cl$ chloride. In this case, hydrolysis of the chlorine enables the compound to be grafted onto the silica support. Then hydrolysis of the sulfonyl chloride releases the acid which can react with the hydrazine to form the hydrazonium ion.

10-(Carbomethoxy)decyldimethylchlorosilane or $CH_3OCO(CH_2)_{10}SiMe_2Cl$. In this case, hydrolysis of the chlorine enables the compound to be grafted onto the silica support. Then hydrolysis of the ester releases the acid which can react with the hydrazine to form the hydrazonium ion.

10-(Carbomethoxy)decyldimethylmethoxysilane or $CH_3OCO(CH_2)_{10}SiMe_2OMe$. In this case, hydrolysis of the alcoxide function enables the compound to be grafted onto the silica support. Then hydrolysis of the ester releases the acid which can react with the hydrazine to form the hydrazonium ion.

10-(Carbomethoxy)decylmethyldichlorosilane or $CH_3OCO(CH_2)_{10}SiMeCl_2$. In this case, hydrolysis of the chlorines enables the compound to be grafted onto the silica support. Then hydrolysis of the ester releases the acid which can react with the hydrazine to form the hydrazonium ion.

10-(Carbomethoxy)decyltrichlorosilane or $CH_3OCO(CH_2)10SiCl_3$. In this case, hydrolysis of the chlorides enables the compound to be grafted onto the silica support. Then hydrolysis of the ester releases the acid which can react with the hydrazine to form the hydrazonium ion.

10-(Carbomethoxy)decyltrimethoxidesilane or $CH_3OCO(CH_2)10SiCl_3$. In this case, hydrolysis of the alcoxide functions enables the compound to be grafted onto the silica support. Then hydrolysis of the ester releases the acid which can react with the hydrazine to form the hydrazonium ion.

2-(4-Chlorosulfonylphenyl)ethyltrimethoxysilane or $ClSO_2C_6H_4CH_2CH_2Si(OMe)_3$. In this case, hydrolysis of the alcoxide functions enables the compound to be grafted onto the silica support. Then hydrolysis of the sulfonyl chloride releases the acid which can react with the hydrazine to form the hydrazonium ion.

ethyl-4(triethoxysilyl)benzoate or $CH_3CH_2OCOC_6H_4Si(OEt)_3$. In this case, hydrolysis of the alcoxide functions enables the compound to be grafted onto the silica support. Then hydrolysis of the ester releases the acid which can react with the hydrazine to form the hydrazonium ion.

triethoxysilylpropylmaleamic acid or $(CH_3CH_2O)_3Si(CH_2)_2NHCOCHCHCOOH$. In this case, hydrolysis of the alcoxide functions enables the compound to be grafted onto the silica support. Then the released acid can react with the hydrazine to form the hydrazonium ion.

3-(Trihydroxysilyl)-propane sulfonic acid or $HOSO_2(CH_2)_3Si(OH)_3$. In this case, the silanol groups enable grafting onto the silica support and the sulfonic acid group reacts with the hydrazine to form the hydrazonium ion.

The use of the hydrazonium ion as reducing agent in the method enables said metallization method of a porous silicon zone to be extended to a very large number of metals and metalloids. Advantageously, the metal can be those cited above (silver, gold, copper, platinum, ruthenium, nickel, lead and cadmium), but also selenium and tellurium.

A method for metallization of a porous silicon zone according to the different embodiments of the invention presents the advantage of being very simple to implement in so far as reduction of the metallic ions is performed in situ and at the same time as fixing of the metallic particles by simple immersion of the zone to be metallized, once the latter has been functionalized in suitable manner. It further enables homogeneous metallization to be obtained over the whole thickness of the zone to be metallized, even in pores that are difficult to access. Finally, it presents the advantage of enabling the size and distribution of the metallic particles formed at the surface of the pores of the zone to be metallized to be controlled by controlling the ratio between the two types of chemical functions present at the surface of the zone to be metallized.

Such a method can therefore be used in a large number of applications. In particular it can be used in the field of fuel cells.

For example purposes, the method for metallization of a porous silicon zone can be used to form a porous and electrically conducting reactive gas diffusion layer of a fuel cell of proton exchange type ("PEM"). The diffusion layer, with a corresponding catalytic layer, in general forms one of the electrodes of the fuel cell. This is particularly interesting in the case of fuel cells presenting a high power density and designed to be used for low- and medium-power applications, such as the field of electric power supply of microcomputers or of emergency electricity generating sets.

According to a particular example, such a metallization method can be integrated in a fuel cell fabrication process, such as that described in the International Patent application filed by the Applicant on Jul. 5, 2009 under filing number PCT/FR2009/000540 and as illustrated by FIGS. 8 to 11.

Figure 8:
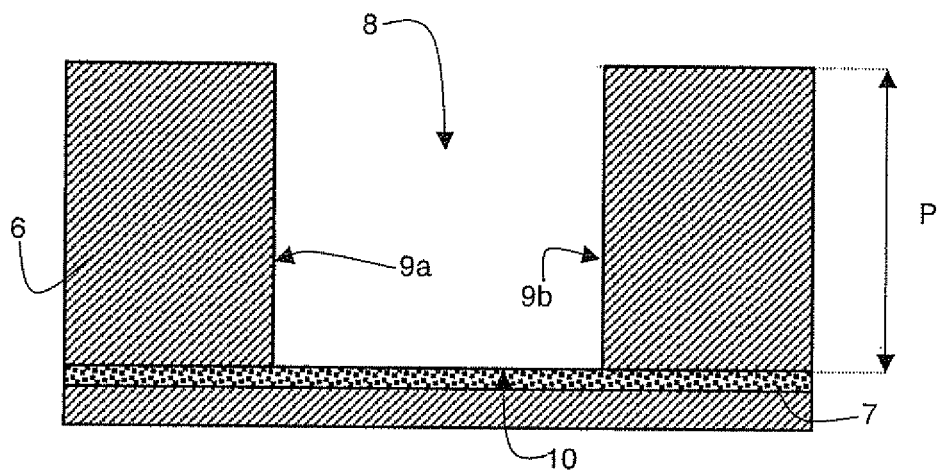
FIGS. 8 to 11 schematically represent different steps of fabrication of a fuel cell comprising a porous silicon substrate, certain parts of which have been metallized to form the electrically conducting diffusion layers of the fuel cell.

Thus, in FIG. 8, a silicon support substrate 6 provided with a buried electrically insulating layer 7 is etched locally to make at least one trench (or deep opening) 8, with etch stopping on insulating layer 7. The etching step can be performed by deep reactive ion etching (RIE) or by chemical etching (KOH).

Trench 8 formed in this way is delineated, in FIG. 8, by two opposite side walls 9a and 9b and a bottom 10 formed by the surface of insulating layer 7 released by the etching operation. Trench 8 further presents a depth P advantageously greater than or equal to 10 micrometers and even more advantageously greater than or equal to 400 micrometers, for a silicon substrate presenting a thickness that can range from a few micrometers up to 750 micrometers (case of silicon wafers with a diameter of 200 mm).

Figure 9:
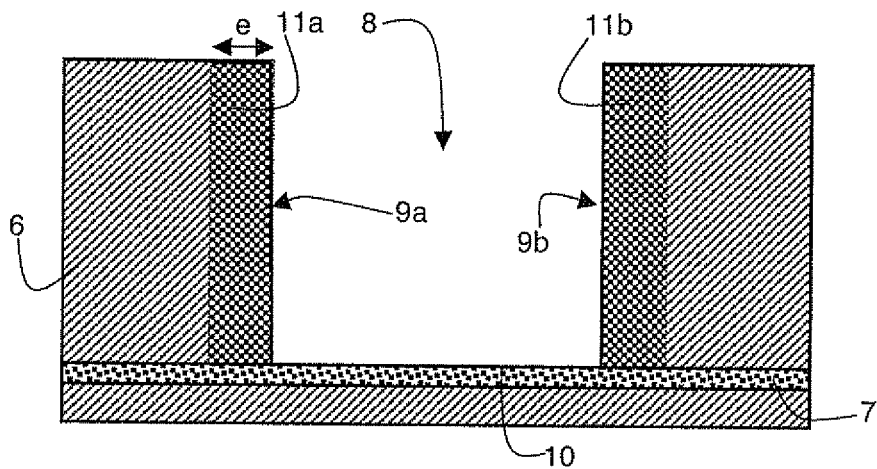
Figure 10:
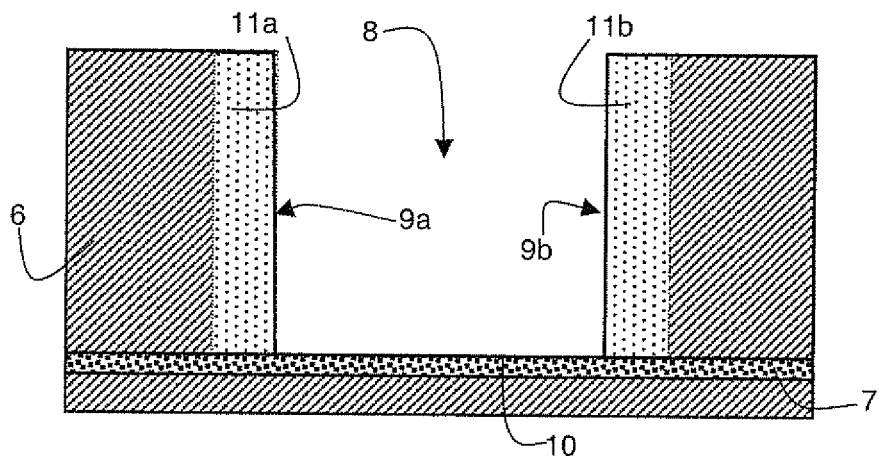

At least a superficial part of the two side walls 9a and 9b is then made porous as illustrated by zones 11a and 11b in FIG. 9. In particular, zones 11a and 11b can be obtained by anodic dissolution in the presence of hydrofluoric acid. They advantageously have a thickness e of a few micrometers. For example purposes, thickness e is comprised between 0.5 and 5 micrometers. Zones 11a and 11b are advantageously made porous by means of a solution containing 5% of hydrofluoric acid, with current densities of about 10 $mA/cm^2$ and anodizing times of about 600 s.

Said zones 11a and 11b are then metallized to make them electrically conducting. The metallization step is therefore performed by grafting zones 11a and 11b by two distinct types of respectively chelating and reducing chemical functions. For example, the chemical functions are a thiol and an ethylene diamine.

Once functionalization of zones 11a and 11b has been performed, said zones are brought into contact with an aqueous solution containing metallic ions, for example $Ag^+$ ions, to perform in situ reduction of the metallic ions and fixing of the metallic particles obtained at the surface of the pores.

Zones 11a and 11b metallized in this way can then form thin layers for diffusion of electrically conducting gases for a fuel cell made in trench 8.

Figure 11:
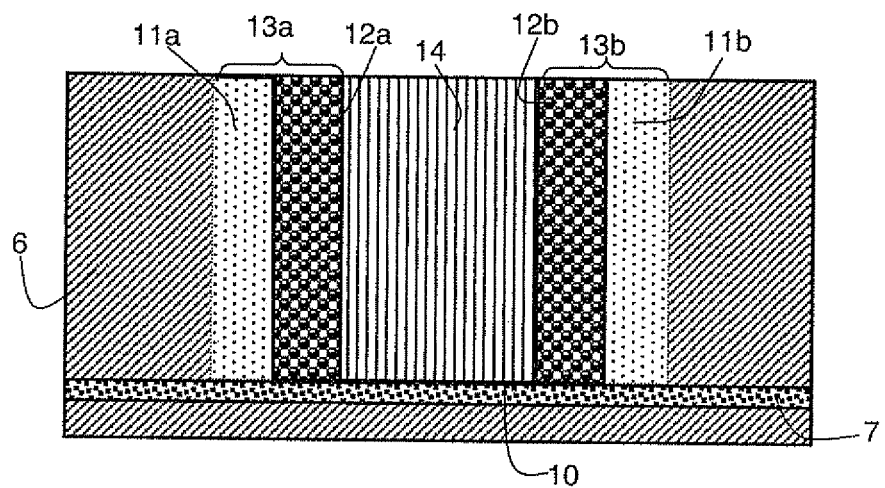
Figure 12:
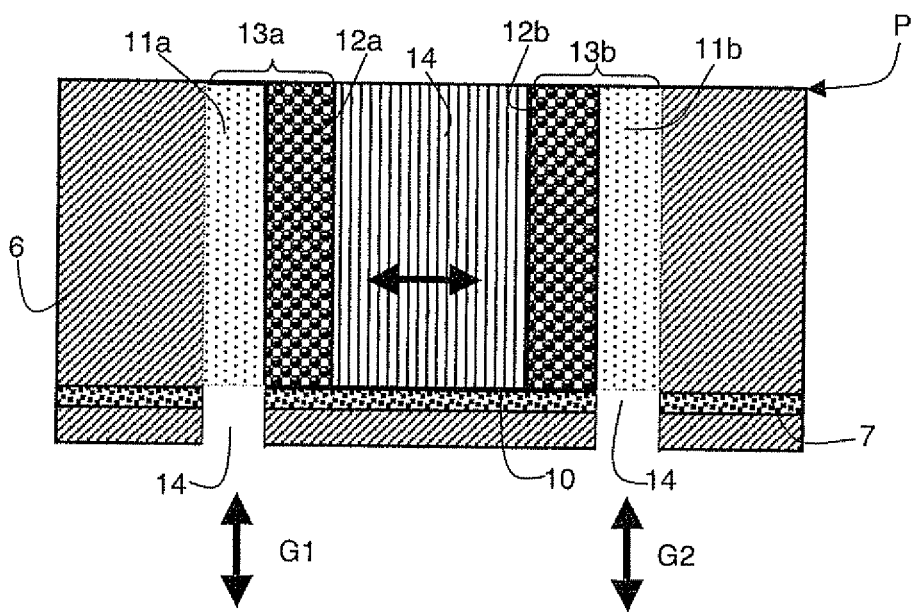
FIG. 12 schematically represents a cross-section of an alternative embodiment of a fuel cell according to FIG. 11.

In this case, zones 11a and 11b are each associated with catalytic layers 12a and 12b deposited on side walls 9a and 9b of trench 8 to form the respective electrodes 13a and 13b of the fuel cell (see FIG. 11). Catalytic layers 12a and 12b are for example deposited by PECVD of platinum or by electrodeposition.

An electrolytic membrane 14 is then formed between the two catalytic layers to fill trench 8. It is for example achieved by filling trench 8 by inkjet with a Nafion® base solution. Lastly, to finalize the fuel cell, trench 8 can be sealed off by deposition of a polymer film, perforated facing zones 11a and 11b.

Such a fuel cell in particular presents the advantage of separating the electrical conduction and sealing functions, while at the same time facilitating assembly of the cell. This enables the power density to be optimized and ohmic loss to be reduced.

In an alternative embodiment, passages 14 can be arranged in support substrate 6, underneath porous diffusion layers 11a and 11b, to enable the fluids to flow perpendicularly to the plane P of support substrate 6 (arrows G1 and G2) whereas the current flows parallel to plane P of support substrate 6 (arrow I).

Metallized zones 11a and 11b can further undergo subsequent silicidation, which can be total (with full consumption of the silicon) or partial, in order to improve the electrical performances and in particular the contact resistance of the device. Silicidation then consists in performing rapid annealing enabling reactive diffusion between the metal and silicon, in order to form an electrically conducting intermetallic compound. Annealing is advantageously performed at a temperature comprised between 200° C. and 800° C., depending on the metal used and the required physicochemical phase. For example purposes, the following silicides can be obtained: NiSi, $NiSi_2$, PtSi, TiSi, $CoSi_2$ etc.

The invention claimed is:

1. Method for metallization of at least a porous silicon zone comprising terminal hydroxide groups, performed during a step of bringing the porous silicon zone into contact with metallic ions dissolved in an aqueous solution containing at least an organic solvent promoting the step of bringing into contact, and wherein the said porous silicon zone, prior to the step of bringing into contact, has been grafted by two distinct types of chemical functions, respectively reducing for the metallic ions and chelating for the metallic ions and/or for the metal corresponding to said metallic ions.

2. Method according to claim 1, wherein grafting of said porous silicon zone is controlled to form adjacent first and second areas each grouping a plurality of chemical functions of the same type.

3. Method according to claim 1, wherein the chemical functions of chelating type are selected from the group consisting of a thiol, a dithiane, EDTA, a thioglycolic acid, a carboxylic acid, a phosphonic acid, a sulfonic acid and derivatives thereof.

4. Method according to claim 1, wherein the chemical functions of reducing type are selected from the group consisting of amine, ethylene diamine, a sugar, an ascorbic acid, an ascorbate, hydroquinone and derivatives thereof.

5. Method according to claim 1, wherein grafting of two types of two chemical functions is obtained in a single step consisting in immersing said zone in a solution comprising ethanol, a precursor comprising a chemical function of chelating type and a precursor comprising a chemical function of reducing type, followed by at least one elimination step of the precursors that did not react.

6. Method according to claim 5, wherein the precursors respectively comprising a chemical function of chelating type and a chemical function of reducing type comply with the respective chemical formulas $X—R—SiZ_1Z_2Z_3$ and $X'—R'—SiZ'_1Z'_2Z'_3$:

where:
R and R' are groups selected from the group consisting of the $C_1$-$C_5$ alkyl chains, unsaturated or not, and from the phenyl groups, $Z_3$ and $Z'_3$ are chemical groups selected from the group consisting of a methoxy-group, an ethoxy-group, a propoxy-group, an acethoxy-group, chlorine and hydrogen, $Z_1$ and $Z_2$ are identical to one another and are a chemical group selected from the group consisting of a methyl group, an ethyl group, a propyl group, an isopropyl group, a butyl group, an isobutyl group and the $Z_3$ chemical group, $Z'_1$ and $Z'_2$ are identical to one another and are a chemical group selected from the group consisting of a methyl group, an ethyl group, a propyl group, an isopropyl group, a butyl group, an isobutyl group and the $Z'_3$ chemical group, X is the chemical function of chelating type and X' is the chemical function of reducing type.

7. Method according to claim 6, wherein the zone is grafted by a thiol chemical function and by an ethylene diamine chemical function.

8. Method according to claim 7, wherein the precursor comprising a thiol chemical function is 3-mercaptopropyltriethoxysilane and a precursor comprising an ethylene diamine chemical function is 2-(aminoethyl)aminopropyltrimetoxysilane or one of its oligomers.

9. Method according to claim 1, wherein the chemical functions of reducing type are hydrazonium ions.

10. Method according to claim 1, wherein the metal is selected from the group consisting of gold, silver, copper, platinum, ruthenium, nickel, lead, cadmium, selenium and tellurium.

11. Method according to claim 1, wherein the porous silicon zone is mesoporous.

12. Method according to claim 1, wherein the aqueous solution contains ethanol and hexane.

13. Fuel cell fabrication method comprising at least a formation step of an electrically conducting porous diffusion layer consisting of a metallized porous silicon zone formed by metallization of a porous silicon zone comprising terminal hydroxide groups, wherein metallization is performed during a step of bringing the porous silicon zone into contact with metallic ions dissolved in an aqueous solution containing at least an organic solvent promoting the step of bringing into contact, and wherein the said porous silicon zone, prior to the step of bringing into contact, has been grafted by two distinct types of chemical functions, respectively reducing for the metallic ions and chelating for the metallic ions and/or for the metal corresponding to said metallic ions.

14. Fuel cell fabrication method according to claim 13, wherein the metallized zone is formed by at least one superficial part of a side wall of a trench formed in a silicon substrate.

* * * * *